United States Patent
Wang et al.

(10) Patent No.: US 7,436,357 B2
(45) Date of Patent: Oct. 14, 2008

(54) BACKGROUND EPHEMERIS DOWNLOAD IN NAVIGATIONAL RECEIVERS

(75) Inventors: Chi-Shin Wang, Half Moon Bay, CA (US); David Wang, Belmont, CA (US); Zongde Qiu, Shishi (CN)

(73) Assignee: Centrality Communications, Inc., Redwood City, CA (US)

( * ) Notice: Subject to any disclaimer, the term of this patent is extended or adjusted under 35 U.S.C. 154(b) by 0 days.

(21) Appl. No.: 11/561,749

(22) Filed: Nov. 20, 2006

(65) Prior Publication Data

US 2008/0117103 A1   May 22, 2008

(51) Int. Cl.
*G01S 5/14* (2006.01)
*G01S 1/02* (2006.01)

(52) U.S. Cl. .................. 342/357.13; 342/357.12; 342/357.15

(58) Field of Classification Search .......... 342/357.06, 342/357.12, 357.13, 357.15; 701/213, 215
See application file for complete search history.

(56) References Cited

U.S. PATENT DOCUMENTS

| | | | |
|---|---|---|---|
| 6,225,945 B1 | 5/2001 | Loomis | |
| 6,429,809 B1 | 8/2002 | Vayanos | |
| 6,559,793 B1 | 5/2003 | Eschenbach | |
| 6,570,530 B2 | 5/2003 | Gaal | |
| 6,707,420 B2 | 3/2004 | Vayanos | |
| 6,727,848 B2 | 4/2004 | Eschenbach | |
| 6,930,635 B2 | 8/2005 | Vayanos | |
| 2006/0068853 A1* | 3/2006 | Dejanovic et al. | 455/574 |
| 2007/0152878 A1* | 7/2007 | Wang et al. | 342/357.06 |
| 2007/0159391 A1* | 7/2007 | Kuo et al. | 342/357.15 |

* cited by examiner

*Primary Examiner*—Dao L Phan
(74) *Attorney, Agent, or Firm*—Orrick, Herrington & Sutcliffe LLP

(57) ABSTRACT

The present invention provides methods and systems for keeping the ephemeris in a navigational receiver current to achieve fast TTFF without the need for connecting to an aiding network or remote server. In an embodiment, the receiver keeps the ephemeris current by downloading the ephemeris in the background. In the preferred embodiment, the receiver uses a background sleep/wake up process to download current ephemeris with minimal power drain. In this embodiment, the receiver alternates between a sleep mode and a wake up mode. During the wake up mode, the receiver attempts to download current ephemeris. The receiver then goes back to the sleep mode until the next wake up to conserve power. The receiver may wake up from the sleep mode to download the ephemeris when the stored ephemeris is no longer current or the ephemeris broadcasted from a satellite has been updated or based on receiver usage patterns.

39 Claims, 3 Drawing Sheets

FIG. 1 A GPS baseband hardware

BACKGROUND EPHEMERIS DOWNLOAD IN NAVIGATIONAL RECEIVERS

FIELD OF THE INVENTION

The present invention relates generally to navigational receivers, and more particularly to systems and methods for maintaining current ephemeris in a navigational receiver.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The superframe contains twenty five frames. The contents of the sub-frame 1, 2 and 3 repeat in every frame of a super-frame except the TOW and occasional change of ephemeris every two hours. Thus the ephemeris of a particular satellite signal contains only the ephemeris of that satellite repeating in every frame. However, almanacs of different satellites are broadcast in-turn in different frames of the navigation data signal of a given satellite. Thus a total of 25 consecutive frames transmit the almanacs of all the 24 satellites in the sub-frame 5. Any additional spare satellite almanacs are included in some of the sub-frame 4.

The almanac and ephemeris are used in the computation of the position of the satellites at a given time. The almanacs are valid for a longer period of six days but provide a less accurate satellite position and Doppler compared to ephemeris. Therefore, almanacs are not used when a fast position fix is required. On the other hand, the accuracy of the computed receiver position depends upon the accuracy of the satellite positions which in-turn depends upon the age of the ephemeris. The use of current ephemeris results in better and faster position estimation than one based on non-current or obsolete ephemeris. Therefore, it is necessary to use current ephemeris to get a fast receiver position fix.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as the in the case of previous 'hot start'. In the third mode, known as 'cold start', the receiver has no knowledge of position, time or ephemeris. As expected the 'hot start' mode results in low Time-To-First-Fix (TTFF) while the 'warm start' mode which has non-current ephemeris may use that ephemeris or the almanac resulting in longer TTFF due to the less accurate Doppler estimation. The 'cold start' takes still more time for the first position fix as there is no data available to aid signal acquisition and position fix.

Therefore, it is necessary to keep the ephemeris in the receiver current for a fast TTFF. Current ephemeris also helps when the received signal is weak and the ephemeris can not be downloaded. Some issued patents teach receiving the ephemeris through an aiding network or remote server instead of from an orbiting satellite. However, this approach results in higher cost and requires additional infrastructure.

SUMMARY

Accordingly, the present invention provides methods and systems for keeping the ephemeris in a navigational receiver current to achieve fast TTFF without the need for connecting to an aiding network or remote server.

In an embodiment, the receiver keeps the ephemeris current by downloading the ephemeris in the background. In the preferred embodiment, the receiver uses a background sleep/wake up process to download current ephemeris with minimal power drain. In this embodiment, the receiver alternates between a sleep mode and a wake up mode. During the wake up mode, the receiver attempts to download current ephemeris. The receiver then goes back to the sleep mode until the next wake up to conserve power. The receiver may wake up from the sleep mode to download the ephemeris when the stored ephemeris is no longer current or the ephemeris broadcasted from a satellite has been updated or based on receiver usage patterns. During the wake up mode, the receiver may first test the received signal strength to determine whether ephemeris can be downloaded. If not, then the receiver may go back to sleep and make another attempt at a later time.

In another embodiment, the receiver determines the visible satellites during wake up to reduce the satellite search time and conserve power. The receiver may determine the visible satellites using a prestored satellite constellation based on the local time and an approximate receiver location. In another embodiment, the receiver estimates the Doppler frequency for a satellite during wake up to reduce the acquisition time of satellite signals. In another embodiment, the receiver uses data aided or partial data aided navigation signal acquisition and tracking to reduce computation and increase signal sensitivity.

An advantage of the present invention is that it does not require the reception of ephemeris from an aiding network or remote server.

The above and other advantages of embodiments of this invention will be apparent from the following more detailed description when taken in conjunction with the accompanying drawings.

DETAILED DESCRIPTION

Figure 1:
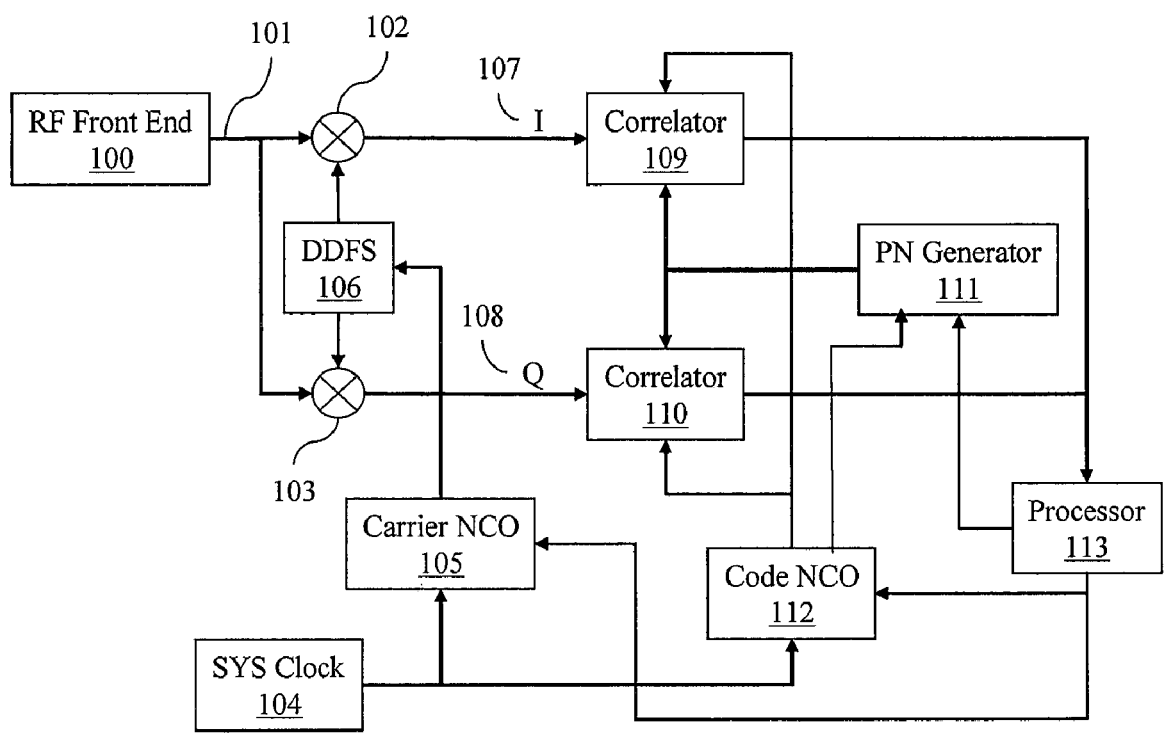
FIG. 1 is a block diagram illustrating a GPS receiver according to an embodiment of the present invention.

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

A GPS receiver uses the downloaded ephemeris to accurately compute the position of the visible satellites. Based on these satellite positions, the position of the receiver is estimated. This computed position is more accurate if the ephemeris used is current. In the case of GPS, the transmitted ephemeris are updated every two hours even though they are valid for a period of four hours.

In an embodiment, the receiver downloads ephemeris in the background when needed to keep the ephemeris in the receiver current. To do this, the receiver uses a background sleep/wake up process in which the receiver alternatively operates in a sleep mode and a wake up mode to conserve power so that the required download can be accomplished with minimal power drain from the battery.

The sleep mode is a power saving mode, in which preferably only the components necessary to wake up the receiver from the sleep mode are operating with all unnecessary components powered off. For example, the RF stage, baseband components, memory and main clock may be powered off in the sleep mode. Only a Real Time Clock (RTC) in the main platform may be operating. At intervals, which may be periodic, aperiodic, random or programmed, the receiver wakes up or is powered up in the wake up mode. During the wake up mode, the receiver performs a fast signal power detection procedure to determine the power level of the navigation signal. If the detected signal power level is at a sufficiently high level, the stored ephemeris is non-current and other conditions such as battery power, etc., are favorable, then the receiver proceeds to download the ephemeris. The receiver may check the age of the ephemeris before or after waking up to determine whether the ephemeris is current. If conditions are not favorable, e.g., power level is too low, then the receiver goes to sleep mode and attempts to download the ephemeris at the next wake up. After the download or unfavorable conditions, the receiver determines the next wakeup time and goes to sleep mode. In some cases, the receiver need not determine the wake up time and a program automatically determines the next wake up time.

The receiver may operate in the sleep/wake up mode when the receiver is switched off by the user or the receiver is moved indoors, which can be detected by a drop in signal strength. If the receiver is on a vehicle, then the receiver may operate in the sleep/wake up mode when the vehicle is turned off. When the receiver or vehicle is turned on or the receiver is moved outdoors, the receiver uses the current ephemeris to compute position if it is stored in the receiver. If the stored ephemeris is non-current, then the receiver may compute and correct the position obtained with non-current ephemeris while downloading the current ephemeris. Methods for determining when the receiver is in an indoor or outdoor environment and methods for correcting the position computed using non-current ephemeris are discussed in patent application Ser. No. 11/561,758 titled "Navigation Signal Receiver Trajectory Determination," filed on the same date as the present application on Nov. 20, 2006, the specification of which is incorporated in its entirety by reference.

The receiver may determine the next wake up time based on the age of the stored ephemeris. For example, the receiver may determine when the stored ephemeris for a satellite is due to expire, e.g., four or six hours after the time stamp on the ephemeris, and schedule the next wake up when the ephemeris expires. Also, the receiver may determine the next wake up time based on the time that the ephemeris for a satellite is to be updated, and schedule the next wake up when the ephemeris has been updated. The wake up time may also be based on usage patterns. For example, to conserve power, the receiver may be programmed not to wake up during a period of time when the user of the receiver is normally asleep. For example, the receiver may be programmed not to download in the early morning, e.g., 2 a.m., and/or to download more frequently just before the user typically wakes up, e.g., 8 a.m., in the morning.

In another embodiment, if no signals can be acquired after several wake up trials, then the receiver may stop the background sleep/wakeup process until the user makes a manual start. This may be done so that the receiver does not waste power attempting to acquire signals in an indoor environment where no signals can be acquired.

Figure 2:
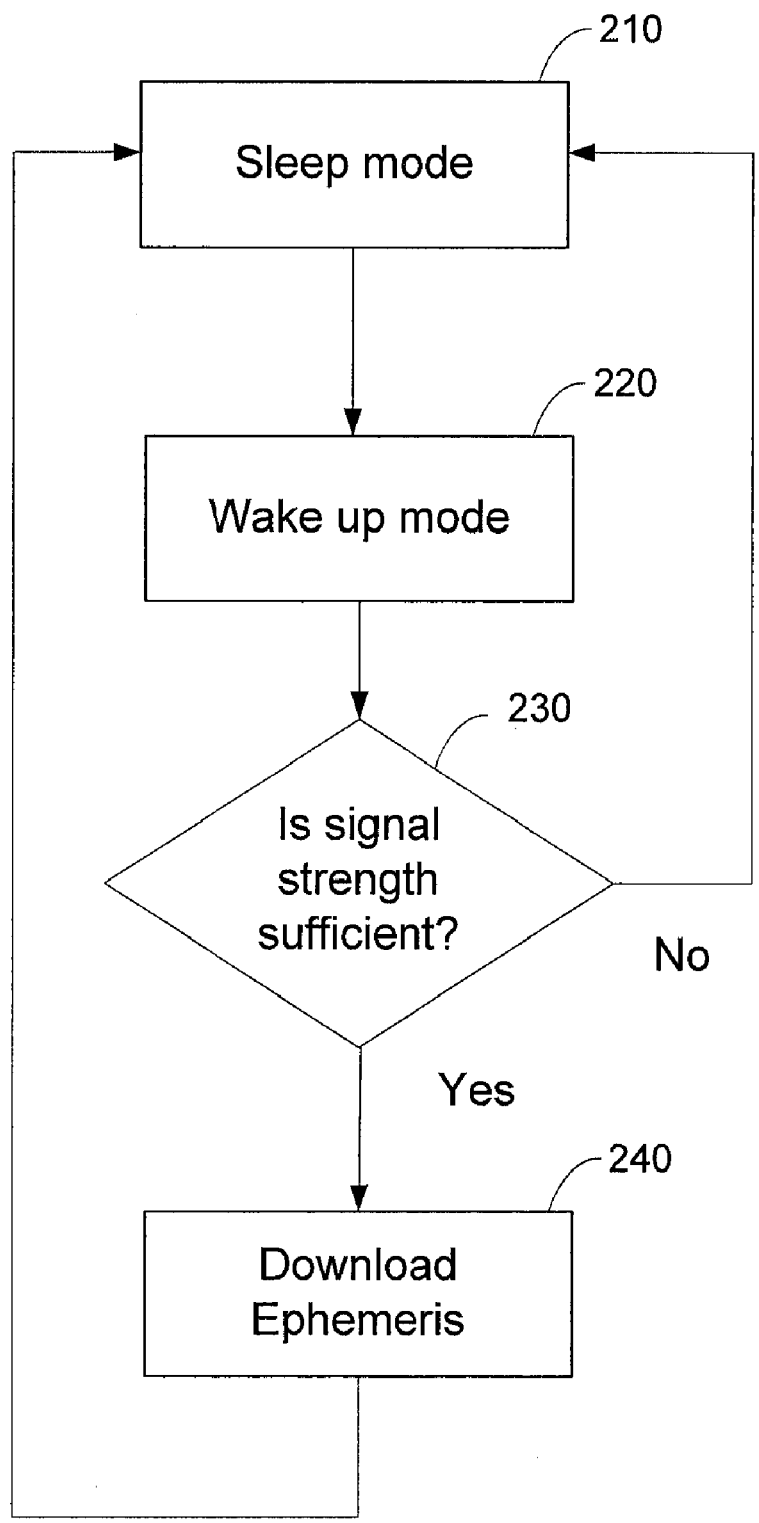
FIG. 2 is a flowchart showing a sleep/wake up process according to an embodiment of the present invention.

FIG. 2 is a flowchart showing a sleep/wake up process according to an embodiment of the invention. In step 210, the receiver is in the sleep mode. The sleep mode may be initiated by the user turning off the receiver or a vehicle coupled to the receiver, entry of the receiver into an indoor environment, etc. In step 220, the receiver wakes up in the wake up mode. The receiver may wake up when stored ephemeris becomes non-current, when ephemeris broadcasted from a satellite is updated, based on usage patterns of the receiver, etc. During wake up, the receiver tests the received signal strength in step 230 to determine whether the signal strength is sufficient to download ephemeris. If the signal strength is not sufficient, then the receiver goes back to the sleep mode and may attempt to download the ephemeris at a later time. If the signal strength is sufficient, then the receiver downloads the ephemeris in step 240. The receiver may also determine a position fix for the receiver during this step and store the position in memory. After download of the ephemeris is complete, the receiver goes back to the sleep mode.

In an embodiment, during wake up, the visible satellites can be predetermined by a prestored constellation based on the local time and the approximate receiver position. The approximate position may be the last saved position in the receiver. The satellite constellation may be computed using ephemeris or almanac, which give the positions of the satellites with time. Knowledge of the visible satellites during wake up enables the receiver to conserve power by only searching for the visible satellites. In an embodiment, the receiver initially focuses its search for one or a few of the visible satellites in all the available channels of the receiver to quickly acquire a first satellite signal. The receiver then demodulates the data from the first acquired signal to determine the GPS time. Once the GPS time is determined, the receiver can determine the bit edges of the other satellite signals, thereby reducing the acquisition time for the other satellites. The receiver may then download the ephemeris from the different satellite signals in different channels of the receiver. Once the ephemeris of all the visible satellites have been downloaded, the receiver may either proceed to compute the position or go to sleep mode.

Figure 3:
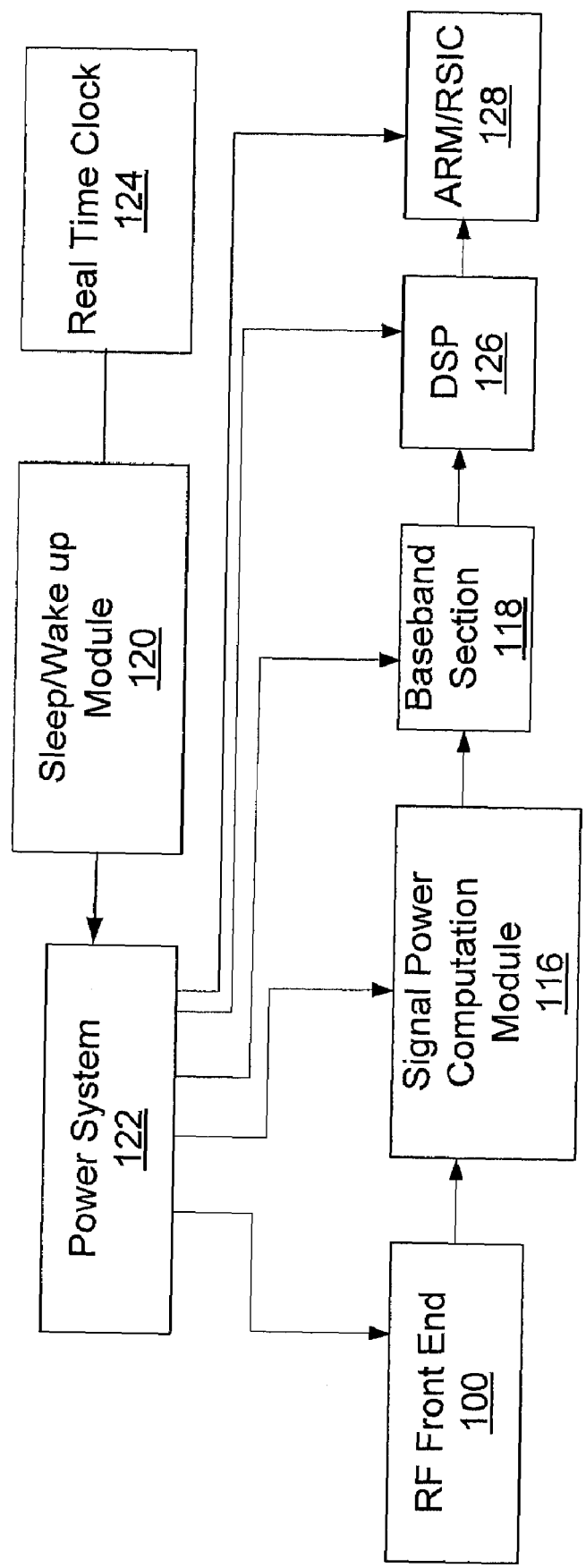
FIG. 3 is a block diagram illustrating a navigation receiver that operates in a sleep/wake up mode according to an embodiment of the present invention.

FIG. 3 is a block diagram showing an exemplary navigation receiver with background ephemeris download capability according to an embodiment of the invention. The receiver includes a sleep/wake up module 120 that wakes up the receiver from the sleep mode to download ephemeris. The sleep/wake up module 120 may wake up the receiver according to a schedule, which may be periodic or aperiodic, may be based on previous wakeup time, usage patterns, indoor or outdoor reception conditions, etc. The receiver also includes a real time clock 124 that is always on to provide clock pulses to the sleep/wake up module 120. The real time clock 124 is used to keep track of time during the sleep mode so that the sleep/wake up module 120 is able to wake up the receiver at the scheduled time. When it is time to wake up the receiver, the sleep/wake up module 120 powers on all the components of the receiver needed for ephemeris downloading via the power system 122. In another embodiment the sleep/wake up module 120 may first power up the RF front end 100 and signal power computation module 116 to compute the received power strength before powering up other components of the receiver. If the signal power computed by the signal power computation module 116 is high enough for ephemeris downloading, then the sleep/wake up module 120 may power up other components of the receiver such as the baseband section 118, the DSP processor 126 and the RSIC/ARM controller 128. Once all the necessary components of the receiver are powered on, the receiver acquires and tracks the satellite signals and starts downloading the ephemeris of all the visible satellites. If required, the receiver position may also be computed. Afterwards, the sleep/wake up module 120 powers off the components 100, 116, 118, 126, 128 via the power system 122 to put the receiver back in the sleep mode. The sleep/wake up module 120 may also determine the next wakeup time. If the signal power computed by the signal power computation module 116 is too weak for ephemeris downloading, then the sleep/wake up module 120 puts the receiver back in sleep mode. At this time the sleep/wake up module 120 may determine the next wakeup time.

In another embodiment, during wake up, the receiver estimates the Doppler frequency of the satellites based on the assumption that the receiver is stationary. In this embodiment, the receiver estimates the velocity of a satellite based on the satellite orbit calculated from navigation messages, e.g., ephemeris, or a predicted orbital model. The receiver also estimates the velocity of the receiver based on the approximate position of the receiver on the Earth and the known rotational speed of the Earth. The receiver then computes the relative velocity between the satellite and the receiver to derive the Doppler frequency. The estimated Doppler frequency reduces the search space of the Doppler frequency range and chip code phase, thereby reducing acquisition time of the satellite signal.

In another embodiment, the receiver may use navigation data which are known or can be computed such as HOW/TLM to perform data aided or partially data aided signal acquisition or tracking to reduce computation and increase sensitivity. Details on data aided acquisition and tracking can be found in patent application Ser. No. 11/584,204 titled "A Method of Mixed Data Assisted and Non Data Assisted Navigation Signal Acquisition, Tracking and Reacquisition," filed on Oct. 10, 2006, the specification of which is incorporated in its entirety by reference.

In another embodiment, the receiver may use the downloaded ephemeris over a period of time to compute a predicted satellite orbit or model. Systems and methods for predicting satellite orbits based on historical navigation data stored in the receiver are disclosed in co-pending U.S. patent application, Ser. No. 11/558,614, titled "A Method and Apparatus in Standalone Positioning Without Broadcast Ephemeris," filed on Nov. 10, 2006, the specification of which is incorporated in its entirety by reference. The satellite orbit can be predicted based on historical broadcast ephemeris using a Kalman filtering algorithm or a least squares estimator. In this embodiment, if current ephemeris can not be downloaded during the background sleep/wake up process and the stored ephemeris is non current, then the receiver can compute satellite position using the predicted satellite orbit.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems or any future satellite based navigation systems such as BIDOU of China. Accordingly, it is intended that the appended claims be interpreted as covering all alterations and modifications as fall within the spirit and scope of the invention.

What is claimed is:

1. A method of maintaining current ephemeris in a navigation receiver, comprising:
   alternating between a sleep mode and a wake up mode;
   testing a received signal strength when the receiver wakes up from the sleep mode;
   if the tested signal strength is sufficient to download ephemeris, downloading current ephemeris if a last downloaded ephemeris is no longer current; and
   if the tested signal strength is too weak to download ephemeris, placing the receiver back in sleep mode.

2. The method of claim 1, further comprising going into the wake up mode at periodic, aperiodic, random, regular or pre-scheduled intervals.

3. The method of claim 1, further comprising, if no satellite signals can be acquired after going into the wake mode several times, stopping the sleep/wake up process until a user makes a manual start.

4. The method of claim 1, wherein the downloading of ephemeris occurs if a satellite signal is acquired and tracked and the last downloaded ephemeris is no longer current.

5. The method of claim 1, further comprising:
   searching for a first satellite signal based on an approximate Location and time;
   acquiring the first satellite signal;
   obtaining timing information from the acquired first satellite signal; and
   determining a bit edge based on the timing information and acquiring other satellite signals using the bit edge.

6. The method of claim 5, wherein the approximate location is a last saved position in the receiver.

7. The method of claim 1, wherein if the receiver is approximately stationary, further comprising:
   estimating a relative velocity between a satellite to be acquired and the receiver based on a satellite orbit calculated from a navigation message or an orbital model of the satellite; and
   estimating a Doppler frequency for the satellite based on the relative velocity between the satellite and the receiver to reduce a search space of Doppler frequency range and chip code phase.

8. The method of claim 1, further comprising determining satellites to be acquired and their ephemeris to be downloaded using a prestored satellite constellation based on a local time and approximate receiver location.

9. The method of claim 1, wherein a successful download can be a combination of bit-error-rate of a message, signal strength of the corresponding satellite and stability of the corresponding signal.

10. The method of claim 1, wherein the wake up mode and a signal detection procedure are optimized for low power consumption.

11. The method of claim 1, wherein the downloading is based on a receiver usage pattern.

12. The method of claim 1, further comprising:
   downloading navigation data when new data is uploaded into a satellite; and
   using known or computed data to perform data aided or partial aided signal acquisition or tracking to reduce computation and increase sensitivity.

13. The method of claim 12, wherein the known or computed data comprises HOW or TLM.

14. The method of claim 1, further comprising using known or precomputed data or decoded navigation message for data demodulation to decrease an error rate of decoded navigation message.

15. The method of claim 12, further comprising:
   downloading navigation data when a useful age of the ephemeris in the receiver is reached; and
   using mixed data aided and non data aided signal acquisition or tracking.

16. A method of maintaining current ephemeris in a navigation receiver, comprising:
   alternating between a sleep mode and a wake up mode; and
   downloading current ephemeris if a last downloaded ephemeris is no longer current;
   wherein when a user initiates a fast start of the receiver, further comprising:
   if the ephemeris of acquired satellites are current, using the ephemeris for a position fix; and
   if not all of the ephemeris of the acquired satellites are current, determining the position and subsequent receiver trajectory by computing the position and subsequent trajectory using the ephemeris and correcting the computed position and subsequent trajectory.

17. The method of claim 16, wherein correcting the computed subsequent trajectory comprises:
   determining a difference between the computed position and an approximate position; and
   shifting the computed subsequent trajectory by the difference.

18. The method of claim of 1, further comprising storing the downloaded ephemeris to predict the satellite orbit and using the predicted satellite orbit to compute satellite position when current ephemeris can not be downloaded.

19. A navigation signal receiver, comprising:
   a radio frequency (RF) front-end for receiving satellite signals;
   a baseband section for processing received signals into correlation values;

a processor coupled to the baseband section, wherein the processor downloads current ephemeris if a last downloaded ephemeris is no longer current;

a signal strength detector for testing a received signal strength from the RF front-end; and a sleep/wake up module coupled to a power system of the receiver, wherein the sleep/wake up module alternately switches the receiver between a sleep mode and a wake up mode;

wherein the signal strength tests the received signal strength when the receiver wakes up from the sleep mode, and if the tested signal strength is sufficient to download ephemeris, the sleep/wake up module powers up the baseband section and the processor to download the current ephemeris from a navigation satellite if the last downloaded ephemeris is no longer current.

20. The receiver of claim 19, wherein the sleep/wake up module switches the receiver to the wake up mode at periodic, aperiodic, random, regular or pre-scheduled intervals.

21. The receiver of claim 19, wherein, if no satellite signals can be acquired after going into the wake mode several times, the sleep/wake up module stops the sleep/wake up process until a user makes a manual start.

22. The receiver of claim 19, wherein the processor downloads ephemeris if a satellite signal is acquired and tracked and the last downloaded ephemeris is no longer current.

23. The receiver of claim 19, wherein during the wake up mode, the processor searches for a first satellite signal based on an approximate location and time, acquires the first satellite signal, obtains timing information from the acquired first satellite signal, and determines a bit edge based on the timing information and acquiring other satellite signals using the bite edge.

24. The receiver of claim 23, wherein the approximate location is a last saved position in the receiver.

25. The receiver of claim 19, wherein if the receiver is approximately stationary, the processor computes a Doppler frequency by:

estimating a relative velocity between a satellite to be acquired and the receiver based on a satellite orbit calculated from a navigation message or an orbital model of the satellite; and estimating the Doppler frequency for the satellite based on the relative velocity between the satellite and the receiver to reduce a search space of Doppler frequency range and chip code phase.

26. The receiver of claim 19, wherein the processor determines satellites to be acquired and their ephemeris to be downloaded using a prestored satellite constellation based on a local time and approximate receiver location.

27. The receiver of claim 19, wherein a successful download can be a combination of bit-error-rate of a message, signal strength of the corresponding satellite and stability of the corresponding signal.

28. The receiver of claim 19, wherein the wake up mode and a signal detection procedure are optimized for low power consumption.

29. The receiver of claim 19, wherein the downloading is based on a receiver usage pattern.

30. The receiver of claim 19, wherein the processor downloads ephemeris by:

downloading navigation data when new data is uploaded into a satellite; and using known or computed data to perform data aided or partial aided signal acquisition or tracking to reduce computation and increase sensitivity.

31. The receiver of claim 30, wherein the known or computed data comprises HOW or TLM.

32. The receiver of claim 19, wherein the processor uses known or precomputed data or decoded navigation message for data demodulation to decrease an error rate of decoded navigation message.

33. The receiver of claim 30, wherein the processor downloads ephemeris by:

downloading navigation data when a useful age of the ephemeris in the receiver is reached; and using mixed data aided and non data aided signal acquisition or tracking.

34. A navigation signal receiver, comprising:

a radio freiuency (RF) front-end for receiving satellite signals;

a baseband section for processing received signals into correlation values;

a processor coupled to the baseband section, wherein the processor downloads ephemeris if a last ephemeris is no longer current; and a sleep/wake up module coupled to a power system of the receiver, wherein the sleep/wake up module alternately switches the receiver between a sleep mode and a wake up mode;

wherein when a user initiates a fast start of the receiver, the processor uses ephemeris to compute a position fix if the ephemeris of acquired satellites are current, and determines the position and subsequent receiver trajectory by computing the position and subsequent trajectory using the ephemeris and correcting the computed position and subsequent trajectory if not all of the acquired ephemeris are current.

35. The method of claim 34, wherein the processor corrects the computed subsequent trajectory by:

determining a difference between the computed position and an approximate position; and shifting the computed subsequent trajectory by the difference.

36. The receiver of claim 19, wherein the RF front-end, baseband section and processor are powered off during the sleep mode and at least the RF front-end is powered on during the wake up mode.

37. The receiver of 19, wherein the processor stores the downloaded ephemeris to predict the satellite orbit and using the predicted satellite orbit to compute satellite position when current ephemeris can not be downloaded.

38. The method of claim 1, further comprising:

when the receiver wakes up from the sleep mode, powering up a radio-frequency (RF) front-end and a signal strength detector in the receiver to test the received signal strength; and if the tested signal strength is sufficient to download ephemeris, powering up a baseband section and a processor in the receiver to download the current ephemeris.

39. The method of claim 1, further comprising waking up the receiver from the sleep mode at a time based on a usage pattern of a user of the receiver.

* * * * *